United States Patent
Iwamoto et al.

(10) Patent No.: US 11,400,998 B2
(45) Date of Patent: Aug. 2, 2022

(54) TRAVELING VEHICLE

(71) Applicant: KAWASAKI JUKOGYO KABUSHIKI KAISHA, Kobe (JP)

(72) Inventors: Taro Iwamoto, Suma-ku (JP); Hiroshi Ishii, Tarumi-ku (JP); Takeshi Nakajima, Hyogo-ku (JP); Kazuya Nagasaka, Akashi (JP); Taichi Inaba, Nada-ku (JP)

(73) Assignee: KAWASAKI MOTORS, LTD., Akashi (JP)

( * ) Notice: Subject to any disclaimer, the term of this patent is extended or adjusted under 35 U.S.C. 154(b) by 72 days.

(21) Appl. No.: 16/947,293

(22) Filed: Jul. 27, 2020

(65) Prior Publication Data
US 2021/0031858 A1 Feb. 4, 2021

(30) Foreign Application Priority Data
Jul. 30, 2019 (JP) .............................. JP2019-140117

(51) Int. Cl.
B62K 5/027 (2013.01)
B62K 5/10 (2013.01)
(Continued)

(52) U.S. Cl.
CPC ............... B62K 5/027 (2013.01); B62K 5/10 (2013.01); B62K 25/16 (2013.01); B62J 25/00 (2013.01);
(Continued)

(58) Field of Classification Search
CPC .............. B60G 21/026; B60G 2300/45; B60G 2300/12; B60G 2300/122;
(Continued)

(56) References Cited

U.S. PATENT DOCUMENTS 8,485,541 B2 * 7/2013 Pozio ....................... B62K 5/10
280/124.136
8,746,717 B2 * 6/2014 Tsujii ..................... B62K 25/24
280/124.103
(Continued)

FOREIGN PATENT DOCUMENTS

CN 204956005 U * 1/2016 ........... B60G 21/073
CN 106394761 2/2017
JP 6143641 6/2017

Primary Examiner — Paul N Dickson
Assistant Examiner — Caitlin Anne Miller
(74) Attorney, Agent, or Firm — Fay Kaplun & Marcin, LLP

(57) ABSTRACT

A traveling vehicle includes a vehicle body, a left swing part, a right swing part, a holding body, and a suspension device. The left swing part rotatably supports a left front wheel. The right swing part rotatably supports a right front wheel. The left swing part and the right swing part are supported on the vehicle body. The holding body for supporting the suspension device is formed in a U-shape so as to sandwich the suspension device in a front-back direction. A support shaft provided in the suspension device is supported on the holding body on both sides in the front-back direction. The suspension device is rotatable about the support shaft. The suspension device is arranged at a position higher than the left swing part and the right swing part, and extends and contracts in conjunction with swings of the left swing part and the right swing part.

19 Claims, 6 Drawing Sheets

(51) Int. Cl.
  *B62K 25/16*    (2006.01)
  *B62J 25/00*    (2020.01)
  *B62K 25/04*    (2006.01)
(52) U.S. Cl.
  CPC .... *B62K 2025/045* (2013.01); *B62K 2204/00* (2013.01)
(58) Field of Classification Search
  CPC .. B60G 2204/8302; B62D 9/02; B62K 5/027; B62K 5/10; B62K 5/08; B62K 5/06; B62K 5/05; B62K 2/005; B62K 2/16; B62K 2204/10; B62K 2204/421; B62K 2025/045; B62K 2005/001; B62K 2202/00
  USPC .................................................. 280/124.106
  See application file for complete search history.

(56) References Cited

U.S. PATENT DOCUMENTS

| | | | |
|---|---|---|---|
| 9,061,564 B1* | 6/2015 | Yu | B60G 21/05 |
| 9,475,535 B2* | 10/2016 | Iizuka | B62K 21/18 |
| 2004/0119259 A1* | 6/2004 | Takayanagi | B62K 5/027 |
| | | | 280/124.134 |
| 2021/0031859 A1* | 2/2021 | Iwamoto | B62K 21/02 |

* cited by examiner

TRAVELING VEHICLE

CROSS-REFERENCE TO RELATED APPLICATIONS

The present application claims priority under 35 U.S.C. § 119 to Japanese Patent Application Serial No. 2019-140117 filed on Jul. 30, 2019. The contents of this application are incorporated herein by reference in their entirety.

BACKGROUND OF THE INVENTION

Field of the Invention

The present invention relates to a traveling vehicle.

Discussion of the Background

A traveling vehicle including a pair of front wheels in left and right has been conventionally known. Japanese Patent No. 6143641 discloses a saddle type vehicle that is a traveling vehicle of this type.

In the saddle type vehicle disclosed in Japanese Patent No. 6143641, a pair of front wheels in left and right are provided at a front part of a vehicle body, and one rear wheel is provided at a rear part. The pair of front wheels in left and right are each coupled to the vehicle body via suspensions.

However, in the configuration of Japanese Patent No. 6143641, individual suspensions are provided for the pair of front wheels in left and right, and thus, there is room for improvement in terms of simplification of the configuration.

SUMMARY OF THE INVENTION

The present invention relates to a suspension function with a simple configuration in a traveling vehicle including a left front wheel and a right front wheel.

According to an aspect of the present invention, a traveling vehicle with the following configuration is provided. That is, the traveling vehicle includes a vehicle body, a left swinging part, a right swinging part, a left front wheel, a right front wheel, a holding body, and a suspension device. The left swing part is arranged on one side in a vehicle width direction, is provided so as to extend forward from the vehicle body, and is supported on the vehicle body so as to be swingable in the up-down direction. The right swing part is arranged on the other side in the vehicle width direction, is provided so as to extend forward from the vehicle body, and is supported on the vehicle body so as to be swingable in the up-down direction. The left front wheel is rotatably supported by the left swing part. The right front wheel is rotatably supported by the right swing part. The holding body is held by the vehicle body.

The suspension device is supported on the holding body and reduces vibration transmitted from the left front wheel and the right front wheel to the vehicle body. The holding body is formed in a U-shape so as to sandwich the suspension device in the front-back direction. The suspension device includes a support shaft supported on both sides in the front-back direction by the holding body. The suspension device is rotatable about the support shaft. The suspension device is arranged at a position higher than the left swing part and the right swing part, and extends and contracts in conjunction with swings of the left swing part and the right swing part.

Thus, in the traveling vehicle including the left front wheel and the right front wheel, it is possible to realize leaning of the vehicle body. Further, the suspension device can be shared between the left front wheel and the right front wheel, and can be applied to a traveling vehicle with a simple configuration. The suspension device can rotate about the support shaft appropriately to the leaning of the vehicle body, and thus vibration from the left and right front wheels on both sides can be appropriately reduced with one suspension device even in a leaned state. The suspension device is often used under severe conditions in which the vibration is transmitted, but in the above-described configuration, the both sides of the support shaft are supported by the holding body which is a U-shaped component. Therefore, the vibration can be smoothly reduced by preventing the support shaft from wobbling, and the durability can be improved.

According to the present invention, it is possible to realize a suspension function with a simple configuration in a traveling vehicle including a left front wheel and a right front wheel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
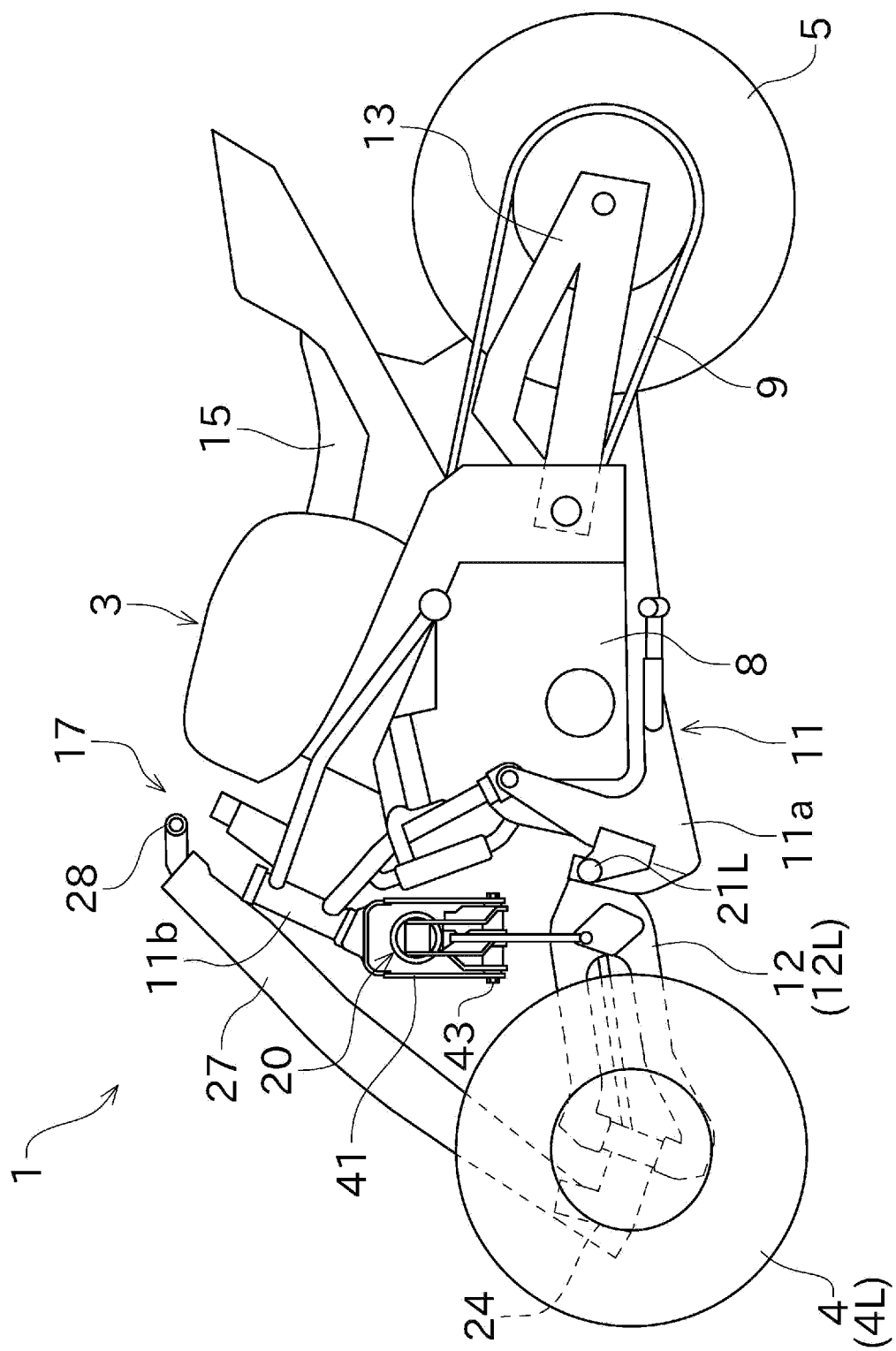
FIG. 1 is a side view of a traveling vehicle according to an embodiment of the present invention.

The embodiments will now be described with reference to the accompanying drawings, wherein like reference numerals designate corresponding or identical elements throughout the various drawings. Firstly, a traveling vehicle 1 of this embodiment will be generally described with reference to FIG. 1. FIG. 1 is a side view of the traveling vehicle 1.

The traveling vehicle 1 shown in FIG. 1 includes a vehicle body 3, a front wheel 4, and a rear wheel 5. The traveling vehicle 1 is a saddle type vehicle in this embodiment. A driver rides on the traveling vehicle 1 while straddling the vehicle body 3 to drive the traveling vehicle 1. It is noted that the type of traveling vehicle is not limited to the saddle type vehicle.

In the following description, front, rear, left, right, up, and down mean front, rear, left, right, up, and down as seen from the driver who rides on the traveling vehicle 1, respectively, unless otherwise specified. A left-right direction corresponds to a vehicle width direction of the traveling vehicle 1.

Two front wheels 4 are arranged in pairs in left and right relative to the vehicle body 3, and provided at the front part of the traveling vehicle 1. The left and right front wheels 4 are arranged at predetermined intervals in the left-right direction. One rear wheel 5 is provided at the center in the left-right direction relative to the vehicle body 3, and is arranged at the rear part of the traveling vehicle 1.

The vehicle body 3 supports a drive source for driving the traveling vehicle 1. In this embodiment, an engine 8 shown in FIG. 1 is used as the drive source. The engine 8 functions as a power unit for driving the rear wheel 5 that is a driving wheel, and is configured as a gasoline engine, for example. A driving force generated in the engine 8 is shifted by a transmission gear (not shown) and transmitted to the rear wheel 5 via a drive chain 9. It is noted that, instead of the engine 8, an electric motor may be used as the drive source of the traveling vehicle 1, for example.

The vehicle body 3 includes a vehicle body frame 11. The vehicle body frame 11 is a strength component serving as a framework for supporting the engine 8, etc., and is formed by using a metal pipe, for example. Left and right front wheel arms 12 and a rear wheel arm 13 are attached to the vehicle body frame 11. The left and right front wheels 4 are rotatably supported by the left and right front wheel arms 12, respectively. The rear wheel 5 is rotatably supported by the rear wheel arm 13.

A seat 15 on which the driver sits is provided in an upper portion of the vehicle body 3. A steering handle 17 operable by the driver sitting on the seat 15 is arranged forward of the seat 15. The steering handle 17 is connected to the front wheels 4. The vehicle body 3 is coupled with the front wheels 4 via a suspension device 20.

Figure 2:
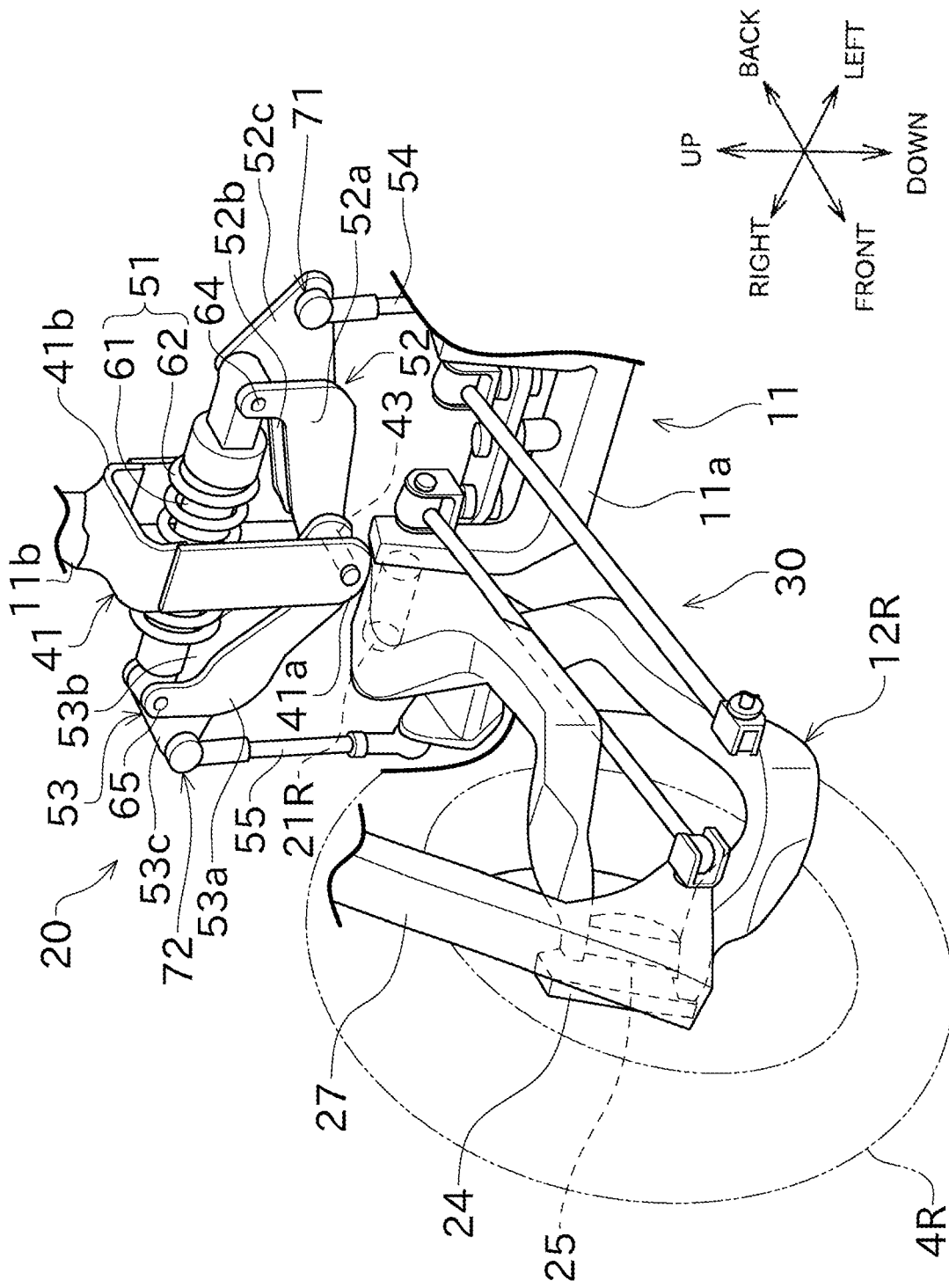
FIG. 2 is a front perspective view showing a configuration of a front part of the traveling vehicle.
Figure 3:
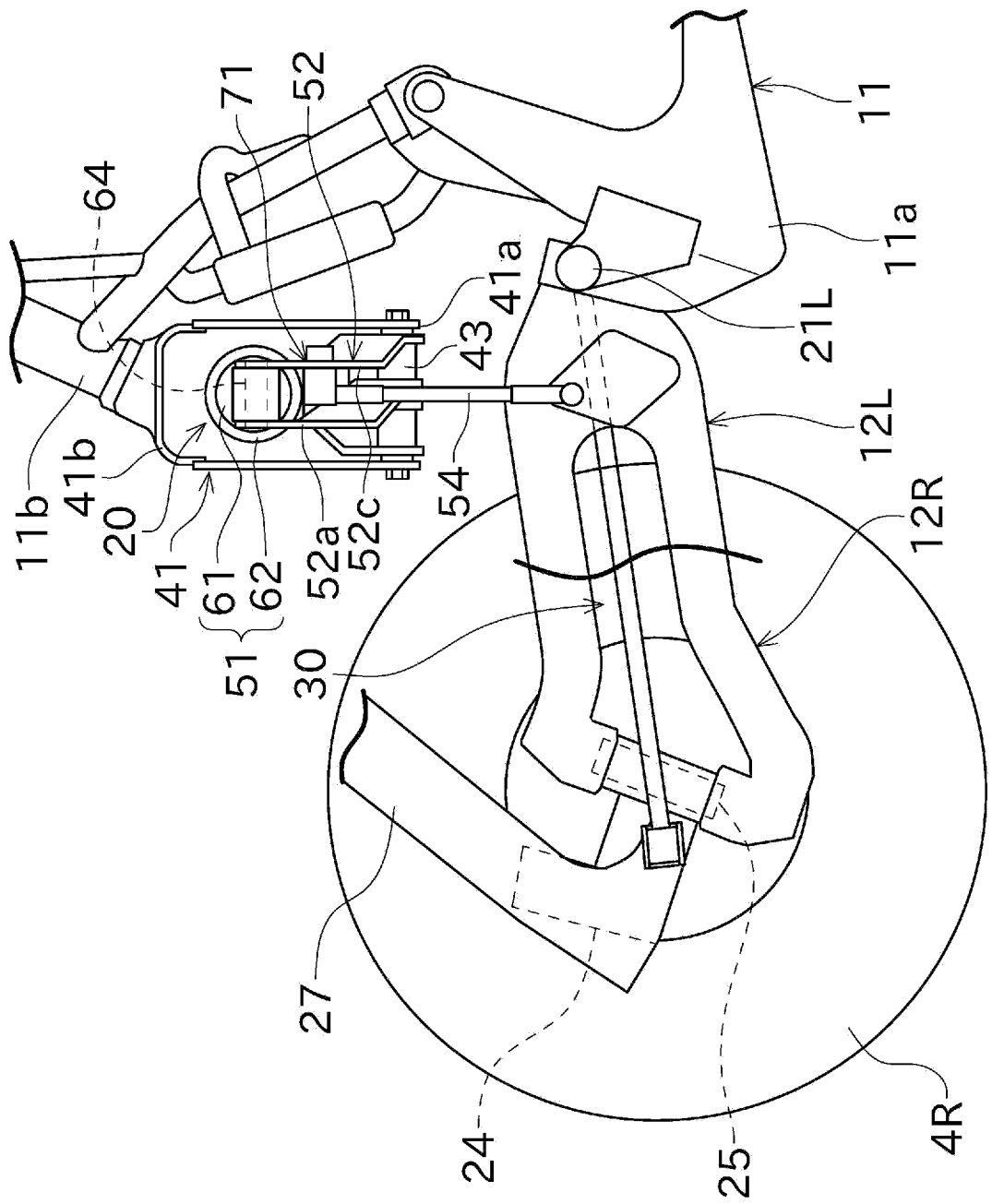
FIG. 3 is a side view showing the configuration of the front part of the traveling vehicle.
Figure 4:
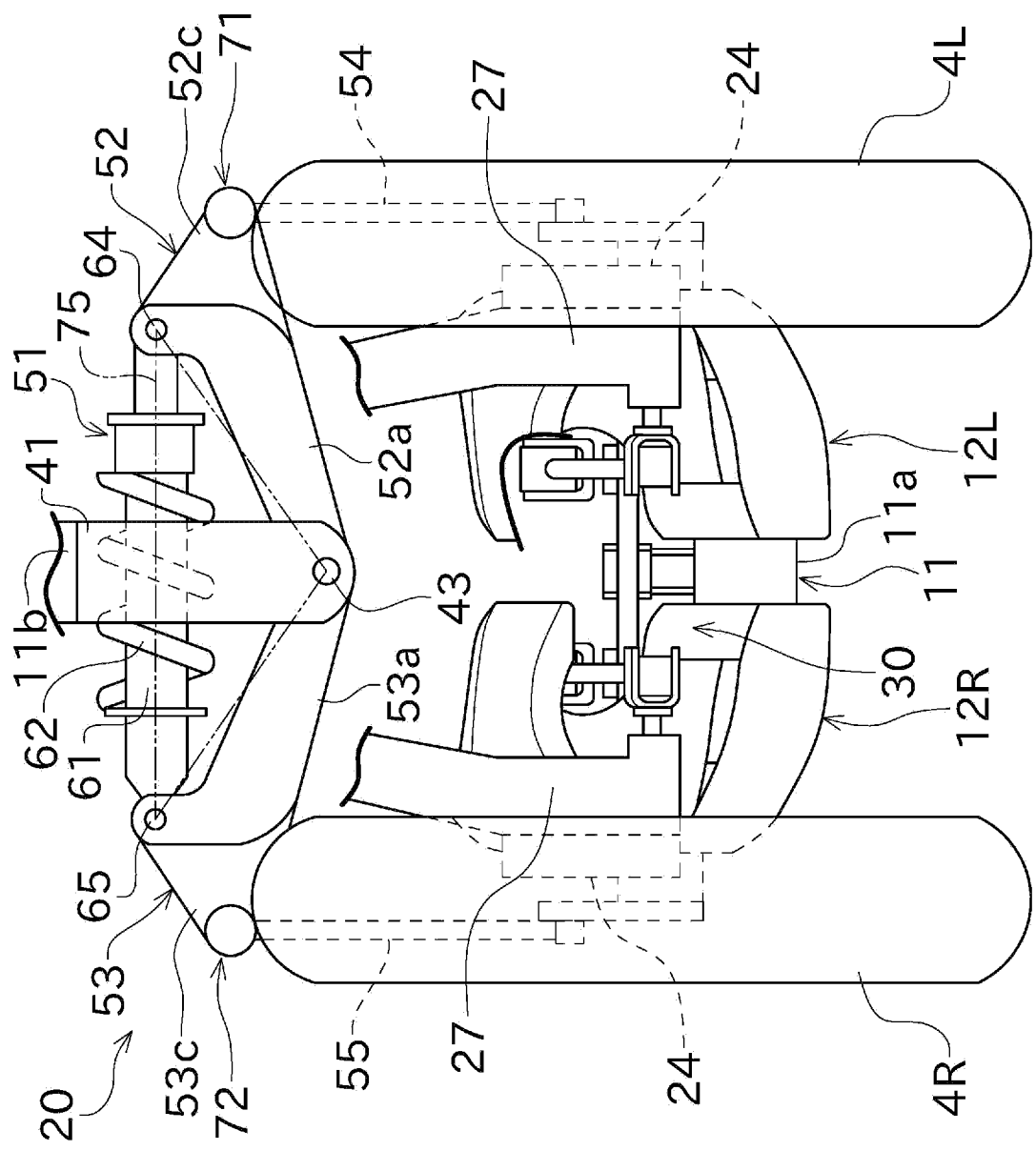
FIG. 4 is a front view showing the configuration of the front part of the traveling vehicle.
Figure 5:
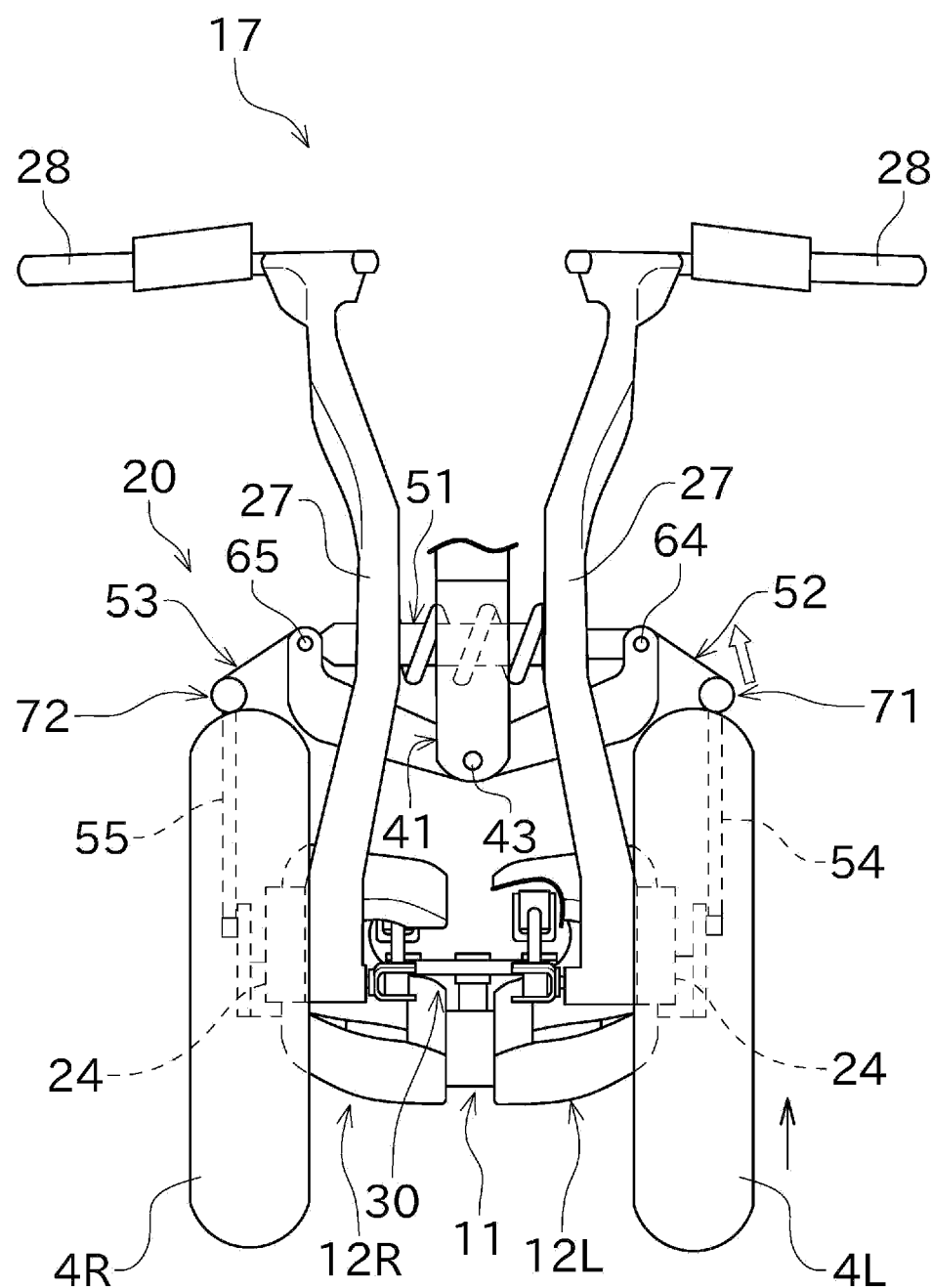
FIG. 5 is a front view showing a non-lean state of a vehicle body.

Next, a configuration of the left and right front wheels 4 and the steering handle 17 will be described with reference to FIGS. 2 to 5. FIG. 2 is a front perspective view showing a configuration of the front part of the traveling vehicle 1. FIG. 3 is a side view showing the configuration of the front part of the traveling vehicle 1. FIG. 4 is a front view showing the configuration of the front part of the traveling vehicle 1. FIG. 5 is a front view showing a non-lean state of the vehicle body 3.

In the following description, as for the left and right front wheels 4, the left wheel may be referred to as "left front wheel 4L" and the right wheel may be referred to as "right front wheel 4R". Similarly, as for the left and right front wheel arms 12, the left arm may be referred to as "left front wheel arm (left swing part) 12L" and the right arm may be referred to as "right front wheel arm (right swing part) 12R".

The steering handle 17 is a type of handle that can be separated in left and right, and the separated parts are connected to the left and right front wheels 4, respectively. A configuration for supporting the left and right front wheels 4 and that for connecting the steering handle 17 and the left and right front wheels 4 are substantially bilaterally symmetric. Therefore, a configuration of the right part will be mainly described below.

As shown in FIGS. 2 to 5, the right front wheel arm 12R is arranged on the right side, which is one side in the vehicle width direction. The right front wheel arm 12R is provided to extend forward from the vehicle body 3, and is supported by the vehicle body 3 so as to be able to swing in the up-down direction. The right front wheel arm 12R is spaced from the left front wheel arm 12L in the left-right direction so as to be form a predetermined gap. As shown in FIG. 4, the right front wheel arm 12R is positioned inside in the vehicle width direction compared to the outer surface in the vehicle width direction of the right front wheel 4R.

A base end (rear end) of the right front wheel arm 12R is supported by a front lower part 11a of the vehicle body frame 11 of the vehicle body 3. The right front wheel 4R is rotatably provided via a support part 24 at a distal end (front part) of the right front wheel arm 12R.

The right front wheel arm 12R is swingable about a right swing shaft 21R. The right swing shaft 21R is provided to extend in the left-right direction. The left front wheel arm 12L is supported on the front lower part 11a of the vehicle body frame 11, similarly to the right front wheel arm 12R. The left front wheel arm 12L is swingable about a left swing shaft 21L. The right swing shaft 21R is arranged coaxially with the left swing shaft 21L.

The support part 24 is provided at the distal end of the right front wheel arm 12R so as to be rotatable around a steering shaft 25. The support part 24 is arranged inside in the vehicle width direction, with respect to a center portion of the right front wheel 4R. The steering shaft 25 is provided so as to extend substantially in the up-down direction. The steering shaft 25 is arranged so as to be inclined such that an upper end thereof is located behind a lower end thereof.

The right front wheel 4R is attached to the support part 24. The right front wheel 4R is capable of rotating with respect to the support part 24 about an axis (not shown) extending in the left-right direction. A right handle stem (right extension) 27 provided in the steering handle 17 is attached to the support part 24. The support part 24 rotates about the steering shaft 25 in accordance with an operation of the handle stem 27.

The steering handle 17 includes a handle grip 28 for the handle stem 27, as shown in FIG. 5. When the driver grips and operates the right handle grip 28, the support part 24 rotates via the right handle stem 27. As a result, an orientation of the right front wheel 4R can be changed.

The right handle stem 27 extends obliquely rearward and upward (in a direction away from the right front wheel 4R) from the support part 24. A base end (lower end) of the handle stem 27 is fixed to the support part 24. A base end of the right handle stem 27 is arranged inside in the vehicle width direction with respect to the right front wheel 4R.

The handle grip 28 is provided at an upper portion of the handle stem 27 as shown in FIG. 5. The right handle grip 28 is arranged so as to protrude outward in the vehicle width direction from the right handle stem 27.

In connection with the left front wheel 4L, the steering handle 17 includes a left handle stem (left extension) 27 and a handle grip (left steering operation part) 28. The left and right handle stems 27 are spaced from each other in the left-right direction.

The left and right handle stems 27 are respectively connected to the left and right front wheels 4 from the inside in the vehicle width direction. Therefore, regardless of a position of the steering handle 17 with respect to the driver, a distance between the left front wheel 4L and the right front wheel 4R can be easily increased. That is, the positions of the left front wheel 4L and the right front wheel 4R are not restricted by the steering handle 17, and a width between the both wheels 4L and 4R be easily adjusted.

The left and right handle stems 27 are coupled to each other via a steering link mechanism 30. The steering link mechanism 30 includes a pair of link rods in left and right and a rotating member for coupling the two link rods. Thereby, the orientation of the left front wheel 4L and the orientation of the right front wheel 4R can be changed in conjunction with each other.

Figure 6:
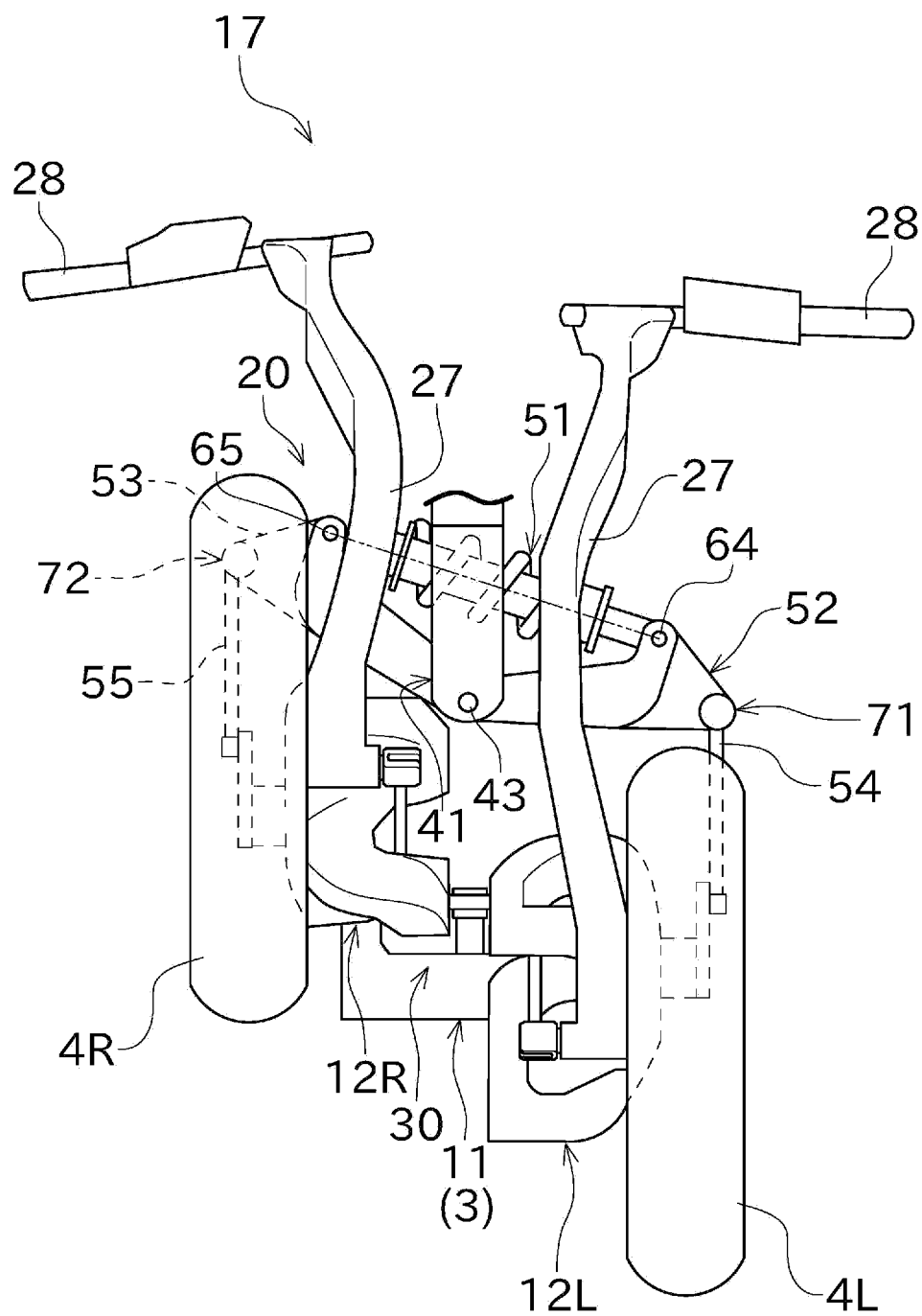
FIG. 6 is a front view showing a lean state of the vehicle body.

Next, the suspension device 20 will be described with reference to FIGS. 1 to 6. FIG. 6 is a front view showing a lean state of the vehicle body 3.

The suspension device 20 can reduce vibration transmitted from the left and right front wheels 4 to the vehicle body 3 via the left and right front wheel arms 12. As shown in FIGS. 1 to 4, the suspension device 20 is attached to the vehicle body 3 via a holding body 41.

The holding body 41 is formed in a U-shape so as to sandwich the suspension device 20 in the front-back direction. As shown in FIG. 3, the holding body 41 is oriented so as to have an inverted U-shape in a side view, and is fixed to a front upper part 11b of the vehicle body frame 11 of the vehicle body 3. As shown in FIG. 4, the holding body 41 is arranged at a position for equally dividing a space between the left and right front wheels 4 into two in the left-right direction.

The suspension device 20 is supported by the holding body 41. The suspension device 20 is arranged so that the most part of the suspension device 20 is at higher position than the left front wheel arm 12L and the right front wheel arm 12R.

As shown in FIG. 3, the holding body 41 includes an opened part 41a and a closed part 41b. The opened part 41a includes an opened portion of the holding body 41 in a side view, and is formed at one end of the holding body 41. The closed part 41b is arranged, in a side view, at an end on the opposite side of a center in the up-down direction of the holding body 41, to the opened part 41a. In this embodiment, the opened part 41a is located on a lower end side of the holding body 41, and the closed part 41b is located on an upper end side of the holding body 41.

The holding body 41 is provided with a support shaft 43 of the suspension device 20. The support shaft 43 is arranged so that an axial direction thereof runs along the front-back direction (vehicle length direction), and is supported on both sides in the front-back direction of the holding body 41. In the holding body 41, the support shaft 43 is attached to a side (lower portion) that is closer to the opened part 41a.

The support shaft 43 is arranged at a position for equally dividing the space between the left and right front wheels 4 in two in a front view of the traveling vehicle 1. The suspension device 20 can rotate about the support shaft 43 with respect to the holding body 41.

The suspension device 20 includes a suspension unit 51, a left rotation arm (left rotation part) 52, a right rotation arm (right rotation part) 53, a left rod 54, and a right rod 55.

The suspension unit 51 is elongated and is configured to extend and contract in the longitudinal direction. The suspension unit 51 is provided inside the holding body 41. As shown in FIG. 3, the suspension unit 51 is arranged on a side (upper side) farther from the opened part 41a than the support shaft 43. Therefore, the suspension unit 51 is arranged so as to pass between the support shaft 43 and the closed part 41b. As shown in FIG. 5, the suspension unit 51 is oriented horizontally in the left-right direction when the vehicle body 3 is in non-lean state.

As shown in FIG. 2, the suspension unit 51 includes a damper 61 and a spring 62. The spring 62 is provided so as to wrap around the damper 61.

The left rotation arm 52 is attached to the holding body 41. The left rotation arm 52 is rotatable about the support shaft 43 with respect to the holding body 41. The left rotation arm 52 is rotatably coupled to one end in the longitudinal direction of the suspension unit 51 via a left coupling shaft 64. The left coupling shaft 64 is arranged along the front-back direction.

The left rotation arm 52 is formed to be elongated, in a front view, so as to extend diagonally upward from the support shaft 43 to the left coupling shaft 64. One end of the left rotation arm 52 is located at a lower portion of the holding body 41, and the other end is located on an upper left side of the holding body 41.

The left rotation arm 52 includes a left front plate 52a and a left rear plate 52b. The left front plate 52a and the left rear plate 52b are each formed of a plate-like member. The left front plate 52a and the left rear plate 52b are spaced from each other in the front-back direction.

Each of the support shaft 43 and the left coupling shaft 64 is bridged between the left front plate 52a and the left rear plate 52b. The left rear plate 52b is provided with a left protrusion part 52c. The left protrusion part 52c is formed so as to protrude outward in the vehicle width direction from the left coupling shaft 64. An upper end of the left rod 54 is coupled to the left protrusion part 52c.

The right rotation arm 53 is attached to the holding body 41. The right rotation arm 53 is rotatable about the support shaft 43 with respect to the holding body 41. The right rotation arm 53 is rotatably coupled to the other end in the longitudinal direction of the suspension unit 51 via a right coupling shaft 65. The right coupling shaft 65 is arranged along the front-back direction. When the vehicle body 3 is in a non-lean state, the left coupling shaft 64 and the right coupling shaft 65 are located at the same height.

The right rotation arm 53 is provided so as to extend obliquely upward from the support shaft 43 to the right coupling shaft 65 in a front view. One end of the right rotation arm 53 is located at a lower portion of the holding body 41, and the other end is located on an upper right side of the holding body 41.

The right rotation arm 53 includes a right front plate 53a and a right rear plate 53b. The right front plate 53a and the right rear plate 53b are each formed of a plate-like member. The right front plate 53a and the right rear plate 53b are spaced from each other in the front-back direction.

Each of the support shaft 43 and the right coupling shaft 65 is bridged between the right front plate 53a and the right rear plate 53b. The right rear plate 53b is provided with a right protrusion part 53c. The right protrusion part 53c is formed so as to protrude outward in the vehicle width direction from the right coupling shaft 65. An upper end of the right rod 55 is coupled to the right protrusion part 53c.

As shown in FIG. 3, the left rod 54 is configured as an elongated member extending in the up-down direction in a side view. The left rod 54 couples the left rotation arm 52 and the left front wheel arm 12L.

One end (lower end) in the longitudinal direction of the left rod 54 is coupled to a middle portion in the longitudinal direction of the left front wheel arm 12L via a spherical bearing. The other end (upper end) in the longitudinal direction of the left rod 54 is coupled to the left protrusion part 52c of the left rotation arm 52 via a spherical bearing.

As shown in FIG. 5, a left coupled portion 71, which is a coupled portion between the left rod 54 and the left rotation arm 52, is arranged outside in the vehicle width direction with respect to the left coupling shaft 64. In the non-lean state of the vehicle body 3, the left coupled portion 71 is arranged at a position higher than the support shaft 43 and lower than the left coupling shaft 64.

With this configuration, when the left front wheel arm 12L swings in the up-down direction, the left rod 54 descends or ascends in accordance with the swing direction of the left front wheel arm 12L. In conjunction with this, the left rotation arm 52 rotates about the support shaft 43. When the suspension unit 51 extends and contracts according to this rotation, the shock is absorbed.

Similarly to the left rod 54, the right rod 55 is configured as an elongated member extending in the up-down direction in a side view. The right rod 55 couples the right rotation arm 53 and the right front wheel arm 12R.

One end (lower end) in the longitudinal direction of the right rod 55 is coupled to a middle portion in the longitudinal direction of the right front wheel arm 12R via a spherical bearing. The other end (upper end) in the longitudinal direction of the right rod 55 is coupled to the right protrusion part 53c of the right rotation arm 53 via a spherical bearing.

As shown in FIG. 5, a right coupled portion 72, which is a coupled portion between the right rod 55 and the right rotation arm 53, is arranged outside in the vehicle width direction with respect to the right coupling shaft 65. In the non-lean state of the vehicle body 3, the right coupled portion 72 is arranged at a position higher than the support shaft 43 and lower than the right coupling shaft 65.

With this configuration, when the right front wheel arm 12R swings in the up-down direction, the right rod 55 descends or ascends in accordance with the swing direction of the right front wheel arm 12R. In conjunction with this, the right rotation arm 53 rotates about the support shaft 43. When the suspension unit 51 extends and contracts according to this rotation, the shock is absorbed.

Next, the lean of the vehicle body 3 will be described. The traveling vehicle 1 is capable of tilt the vehicle body 3 in the left-right direction by raising one of the left and right front wheel arms 12 and lowering the other thereof from the state shown in FIG. 5. FIG. 6 shows a state in which the heights of the left and right front wheels 4 are different. FIG. 6 shows a state in which the vehicle body 3 stands upright for easy comparison with the state of FIG. 5. However, in reality, the vehicle body 3 is leaned according to a difference in height between the left and right front wheels 4 shown in FIG. 6.

Next, an arrangement of the suspension device 20 will be described. As shown in FIG. 4, when the vehicle body 3 is in the non-lean state, the suspension device 20 is configured to be substantially bilaterally symmetrical, in a front view, with respect to a vertical straight line passing through the support shaft 43.

In connection with the suspension unit 51, in a front view, a triangle 75 with vertices being at the positions of the support shaft 43, the left coupling shaft 64, and the right coupling shaft 65, respectively, may be virtually formed. The triangle 75 is an isosceles triangle, and the support shaft 43 corresponds to an apex. In the non-lean state of the vehicle body 3, the triangle 75 is bilaterally symmetric.

The left rod 54 and the right rod 55 are equal in length to each other. When the vehicle body 3 is in the non-lean state, the left coupled portion 71 which is a coupled portion between the left rod 54 and the left rotation arm 52 and the right coupled portion 72 which is a coupled portion between the right rod 55 and the right rotation arm 53 are substantially the same in height. Therefore, the left rod 54 and the right rod 55 are bilaterally symmetric with respect to a vertical straight line passing through the support shaft 43.

As a result of this symmetrical arrangement, in the non-lean state of FIG. 5, a rotation angle of the left rotation arm 52 obtained when the left front wheel 4L ascends/descends by a certain distance and a rotation angle of the right rotation arm 53 obtained when the right front wheel 4R ascends/descends by the same distance are equal.

Even in the lean state of FIG. 6, a rotation angle of the left rotation arm 52 obtained when the left front wheel 4L ascends/descends by a certain distance and a rotation angle of the right rotation arm 53 obtained when the right front wheel 4R ascends/descends by the same distance are substantially equal.

The suspension unit 51 is arranged between the left rotation arm 52 and the right rotation arm 53, and thus, vibration can be absorbed bilaterally symmetrically.

Thus, the traveling vehicle 1 of this embodiment may use the suspension device 20 commonly used for the left front wheel and the right front wheel to appropriately alleviate the vibration from each of the left front wheel 4L and the right front wheel 4R irrespective of whether the vehicle body 3 is in the lean state or non-lean state. As a result, it is possible to realize a suspension function with a simple configuration.

When the traveling vehicle 1 is traveling, the left and right front wheels 4 receive vibration due to an influence of a road surface or the like. This vibration is transmitted to the suspension device 20 via the front wheel arm 12 and the left rod 54/the right rod 55. The suspension device 20 is supported on the vehicle body 3 by one support shaft 43. The vibration of the left and right front wheels 4 acts on the one suspension device 20, and thus, a shock applied to the support shaft 43 is large. In this regard, in this embodiment, a front part and a rear part of the support shaft 43 are supported by the U-shaped holding body 41. Therefore, due to a feature that the both sides of the support shaft 43 are supported, it is possible to effectively reduce wobbling or the like of the support shaft 43 and realize a smooth absorption of the vibration by the suspension device 20.

The holding body 41 is arranged in an inverted U shape in a side view. Therefore, it is possible to easily realize a layout in which the suspension device 20 is suspended from the vehicle body frame 11 via the holding body 41. As a result, it is possible to obtain a compact configuration where the suspension device 20 hardly interferes with a configuration of the lower front part of the traveling vehicle 1 (for example, the steering link mechanism 30 for coordinating turning of the left and right front wheels 4).

The left rod 54 is oriented vertically in a side view, and couples the left front wheel arm 12L and the left rotation arm 52. Similarly, the right rod 55 is oriented vertically in a side view, and couples the right front wheel arm 12R and the right rotation arm 53. Therefore, a vertical movement of the left and right front wheels 4 can be efficiently transmitted to the suspension device 20 to absorb the vibration.

In the non-lean state of the vehicle body 3, the coupled portion (left coupled portion 71) between the left rod 54 and the left rotation arm 52 is arranged at a position higher than the support shaft 43. The same applies to the coupled portion (right coupled portion 72) between the right rod 55 and the right rotation arm 53. In this configuration, for example, a case is considered where the left front wheel 4L rides on a protrusion on a road surface and moves upward as indicated by an arrow in FIG. 5. The left rod 54 coupled to the left front wheel arm 12L pushes up the left rotation arm 52 in conjunction with the elevation of the left front wheel 4L. At this time, the left coupled portion 71 moves in a direction indicated by a white arrow in FIG. 5 along an arc about the support shaft 43. Thus, this embodiment forms a layout where the left coupled portion 71 moves upward and inward in the vehicle width direction as a result of the left rotation arm 52 being pushed up by the left rod 54. Similarly, when the right rod 55 pushes up the right rotation arm 53, the right coupled portion 72 moves upward and inward in the vehicle width direction. Therefore, a space required for an operation of the suspension device 20 can be reduced, in particular, in the vehicle width direction.

As described above, the traveling vehicle 1 of this embodiment includes the vehicle body 3, the left front wheel arm 12L, the right front wheel arm 12R, the left front wheel 4L, the right front wheel 4R, the holding body 41, and the suspension device 20. The left front wheel arm 12L is arranged on one side in the vehicle width direction, is provided so as to extend forward from the vehicle body 3, and is supported on the vehicle body 3 so as to be swingable in the up-down direction. The right front wheel arm 12R is arranged on the other side in the vehicle width direction, is provided so as to extend forward from the vehicle body 3, and is supported on the vehicle body 3 so as to be swingable in the up-down direction. The left front wheel 4L is rotatably supported on the left front wheel arm 12L. The right front wheel 4R is rotatably supported on the right front wheel arm 12R. The holding body 41 is held on the vehicle body 3. The suspension device 20 is supported on the holding body 41 to reduce the vibration transmitted from the left front wheel 4L and the right front wheel 4R to the vehicle body 3. The holding body 41 is formed in a U-shape so as to sandwich the suspension device 20 in the front-back direction. The suspension device 20 includes the support shaft 43 supported on the holding body 41 on the both sides in the front-back direction. The suspension device 20 is rotatable about the support shaft 43. The suspension device 20 is arranged at a position higher than the left front wheel arm 12L and the right front wheel arm 12R, and extends and contracts in conjunction with the swings of the left front wheel arm 12L and the right front wheel arm 12R.

Thus, in the traveling vehicle 1 including the left front wheel 4L and the right front wheel 4R, the leaning of the vehicle body 3 can be realized. Further, the suspension device 20 can be shared between the left front wheel 4L and the right front wheel 4R, and a simple configuration of the traveling vehicle 1 can be realized. The suspension device 20 can rotate about the support shaft 43 appropriately to the leaning of the vehicle body 3, and thus vibration from each of the left front wheel 4L and the right front wheel 4R can be appropriately reduced with one suspension device 20 even in a leaned state. The suspension device 20 is often used under severe conditions in which the vibration is transmitted, but in the above-described configuration, the both sides of the support shaft 43 are supported by the holding body 41 which is a U-shaped component. Therefore, the vibration can be smoothly reduced by preventing the support shaft 43 from wobbling, and the durability can be improved.

In the traveling vehicle 1 of this embodiment, the suspension device 20 includes the suspension unit 51, the left rotation arm 52, the right rotation arm 53, the left rod 54, and the right rod 55. The suspension unit 51 is configured to extend and contract in the vehicle width direction. The left rotation arm 52 is coupled to one end in the extending and contracting direction of the suspension unit 51, and is rotatably provided on the holding body 41 via the support shaft 43. The right rotation arm 53 is coupled to the other end in the extending and contracting direction of the suspension unit 51, and is rotatably provided on the holding body 41 via the support shaft 43. The left rod 54 couples the left rotation arm 52 and the left front wheel arm 12L. The right rod 55 couples the right rotation arm 53 and the right front wheel arm 12R.

Thus, the suspension device 20 can be easily configured by using the left rotation arm 52, the right rotation arm 53, and the suspension unit 51.

Further, in the traveling vehicle 1 of this embodiment, the left rod 54 is arranged so as to extend in the vertical direction in a side view. The right rod 55 is arranged so as to extend in the vertical direction in a side view.

Thus, a vibration absorbing function of the suspension device 20 can be improved.

In the traveling vehicle 1 of this embodiment, when the vehicle body 3 is in the non-lean state, the left coupled portion 71 between the left rod 54 and the left rotation arm 52 and the right coupled portion 72 between the right rod 55 and the right rotation arm 53 are respectively arranged at positions higher than the support shaft 43.

Thus, when the left rod 54 pushes up the left rotation arm 52, the left coupled portion 71 moves inward in the vehicle width direction. Similarly, when the right rod 55 pushes up the right rotation arm 53, the right coupled portion 72 moves inward in the vehicle width direction. Therefore, the space required for placing the suspension device 20 can be reduced, in particular, can be reduced in the vehicle width direction.

In the traveling vehicle 1 of this embodiment, in the non-lean state of the vehicle body 3, a triangle 75 with vertices being at the positions of the support shaft 43, the left coupling shaft 64 between the left rotation arm 52 and the suspension unit 51, and the right coupling shaft 65 between the right rotation arm 53 and the suspension unit 51, respectively, is bilaterally symmetric in a front view. The left rod 54 and the right rod 55 are bilaterally symmetrically arranged in a front view.

As a result, the suspension device 20 functions with good left-right balance.

Further, in the traveling vehicle 1 of this embodiment, the support shaft 43 is arranged at a position for equally dividing the space between the left and right front wheels 4 into two in the left-right direction.

Thus, it is possible to prevent the operation of the suspension device 20 from being biased in left and right with a simple configuration.

In the traveling vehicle 1 of this embodiment, the support shaft 43 is arranged closer to the opened part 41a of the U-shaped holding body 41. Inside the holding body 41, the suspension unit 51 is arranged on a farther away from the opened part 41a than the support shaft 43.

As a result, it is possible to realize a compact layout of the holding body 41 and the suspension unit 51.

In the traveling vehicle 1 of this embodiment, the holding body 41 is formed in a U-shape open to the underside.

As a result, the opposite side of the holding body 41, to the opened side, is positioned on the upper side, and thus, it becomes easy to apply the present invention to, for example, a traveling vehicle including a layout in which the vehicle body frame 11 is arranged in the upper portion of the vehicle body 3.

Although a preferred embodiment of the present invention has been described above, the configuration described above can be modified, for example, as follows.

In the above-described embodiment, the holding body 41 to which the suspension device 20 is attached is arranged at the front upper part of the vehicle body 3 (vehicle body frame 11), but the present invention is not limited thereto. Thus, the holding body 41 can be arranged at any position in the vehicle body 3.

The left rod 54 and the right rod 55 may be arranged not in the vertical direction in a side view but in a somewhat inclined direction.

The left coupled portion 71 between the left rod 54 and the left rotation arm 52 and the right coupled portion 72 between the right rod 55 and the right rotation arm 53 may be arranged at positions lower than the support shaft 43, respectively.

Inside the holding body 41, the suspension unit 51 may be arranged closer to the opened part 41a than the support shaft 43.

The holding body 41 may not be arranged so as to be open to the underside.

Obviously, numerous modifications and variations of the present invention are possible in light of the above teachings. It is therefore to be understood that within the scope of the appended claims, the invention may be practiced otherwise than as specifically described herein.

What is claimed is:

1. A traveling vehicle, comprising:
   a vehicle body;
   a left swing part which is arranged on one side in a vehicle width direction, which is provided so as to extend forward from the vehicle body, and which is supported on the vehicle body so as to be swingable in an up-down direction;
   a right swing part which is arranged on another side in the vehicle width direction, which is provided so as to extend forward from the vehicle body, and which is supported on the vehicle body so as to be swingable in the up-down direction;
   a left front wheel rotatably supported by the left swing part;
   a right front wheel rotatably supported by the right swing part;
   a holding body held by the vehicle body;
   a vehicle body frame, wherein the holding body is suspended from a portion of the vehicle body frame that is above the holding body in the up-down direction; and
   a suspension device which is supported on the holding body and which reduces vibration transmitted from the left front wheel and the right front wheel to the vehicle body,
   wherein the holding body is formed in a U-shape so as to sandwich the suspension device in a front-back direction,
   wherein the suspension device includes a support shaft supported on both sides in the front-back direction by the holding body,
   wherein the suspension device is rotatable about the support shaft, and
   wherein the suspension device is arranged at a position higher than the left swing part and the right swing part, and extends and contracts in conjunction with swings of the left swing part and the right swing part.

2. The traveling vehicle according to claim 1, wherein the suspension device comprises:
   a suspension unit configured to extend and contract in the vehicle width direction;
   a left rotation part which is coupled to one end in the vehicle width direction of the suspension unit and which is rotatably provided on the holding body via the support shaft;
   a right rotation part which is coupled to another end in the vehicle width direction of the suspension unit and which is rotatably provided on the holding body via the support shaft;
   a left rod that couples the left rotation part and the left swing part; and
   a right rod that couples the right rotation part and the right swing part.

3. The traveling vehicle according to claim 2, wherein the left rod is arranged so as to extend in the up-down direction, and wherein the right rod is arranged so as to extend in the up-down direction.

4. The traveling vehicle according to claim 2, wherein a left coupled portion between the left rod and the left rotation part and a right coupled portion between the right rod and the right rotation part are respectively arranged at positions higher than the support shaft.

5. The traveling vehicle according to claim 2, wherein in a non-lean state of the vehicle body, a triangle with vertices being at positions of the support shaft, a coupled portion between the left rotation part and the suspension unit, and a coupled portion between the right rotation part and the suspension unit, respectively, is bilaterally symmetric in a front view, and wherein the left rod and the right rod are bilaterally symmetrically arranged in the front view.

6. The traveling vehicle according to claim 5, wherein in the non-lean state of the vehicle body, a part of the suspension device overlaps the left and right front wheels in the front view.

7. The traveling vehicle according to claim 2, wherein the support shaft is positioned at a center in the vehicle width direction.

8. The traveling vehicle according to claim 2, wherein the support shaft is arranged closer to an opened part of the U-shaped holding body, and wherein inside the holding body, the suspension unit is arranged farther away from the opened part than the support shaft.

9. The traveling vehicle according to claim 8, wherein the holding body is formed in a U-shape open to the underside.

10. The traveling vehicle according to claim 2, wherein the left rod is connected to a middle portion on an outer side of the left swing part in the vehicle width direction and the right rod is connected to a middle portion on an outer side of the right swing part in the vehicle width direction.

11. The traveling vehicle according to claim 2, wherein the left swing part includes:
    a front portion which is connected to the left front wheel;
    a rear portion which is connected to the vehicle body; and
    an inward portion which connects the front portion and the rear portion,
    wherein the inward portion is located inward of the front portion and the rear portion in the vehicle width direction, and
    wherein the left rod connects to the rear portion of the left swing part.

12. The traveling vehicle according to claim 2, wherein the right swing part includes:
    a front portion which is connected to the right front wheel;
    a rear portion which is connected to the vehicle body; and
    an inward portion which connects the front portion and the rear portion,
    wherein the inward portion is located inward of the front portion and the rear portion in the vehicle width direction, and
    wherein the right rod connects to the rear portion of the right swing part.

13. The traveling vehicle according to claim 2, wherein the left rotation part includes a projecting portion connected to the left rod and the right rotation part includes a projecting portion connected to the right rod.

14. The traveling vehicle according to claim 2, wherein, in the front view, the left rod is hidden by the left front wheel and the right rod is hidden by the right front wheel.

15. The traveling vehicle according to claim 2, wherein the left rod is connected to the left swing part via a spherical bearing and the right rod is connected to the right swing part via a spherical bearing.

16. The traveling vehicle according to claim 1, wherein the suspension device is located rearward of the left and right front wheels.

17. The traveling vehicle according to claim 1, wherein the suspension device includes a suspension unit configured to extend and contract in the vehicle width direction, and the suspension unit is located inside the holding body.

18. A traveling vehicle, comprising:

a vehicle body;

a left swing part which is arranged on one side in a vehicle width direction, which is provided so as to extend forward from the vehicle body, and which is supported on the vehicle body so as to be swingable in an up-down direction;

a right swing part which is arranged on another side in the vehicle width direction, which is provided so as to extend forward from the vehicle body, and which is supported on the vehicle body so as to be swingable in the up-down direction;

a left front wheel rotatably supported by the left swing part;

a right front wheel rotatably supported by the right swing part;

a holding body held by the vehicle body;

a vehicle body frame, wherein the holding body is suspended from a portion of the vehicle body frame that is above the holding body in the up-down direction; and a suspension device which is supported on the holding body and which reduces vibration transmitted from the left front wheel and the right front wheel to the vehicle body, wherein the suspension device includes a support shaft supported on both sides in the front-back direction by the holding body, wherein the suspension device is rotatable about the support shaft, and wherein the suspension device is arranged at a position higher than the left swing part and the right swing part, and extends and contracts in conjunction with swings of the left swing part and the right swing part.

19. A traveling vehicle, comprising:

a vehicle body;

a vehicle body frame;

a left swing part which is arranged on one side in a vehicle width direction, which is provided so as to extend forward from the vehicle body, and which is supported on the vehicle body so as to be swingable in an up-down direction;

a right swing part which is arranged on another side in the vehicle width direction, which is provided so as to extend forward from the vehicle body, and which is supported on the vehicle body so as to be swingable in the up-down direction;

a left front wheel rotatably supported by the left swing part;

a right front wheel rotatably supported by the right swing part;

a holding body held by the vehicle body; and a suspension device which is supported on the holding body and which reduces vibration transmitted from the left front wheel and the right front wheel to the vehicle body, wherein the suspension device includes a support shaft supported on both sides in the front-back direction by the holding body, wherein the suspension device is rotatable about the support shaft, wherein the suspension device is arranged at a position higher than the left swing part and the right swing part, and extends and contracts in conjunction with swings of the left swing part and the right swing part, and wherein the suspension device is located rearward of the left and right front wheels.

* * * * *